Dec. 14, 1937.                     W. LA HODNY                     2,102,012
SUPPORT
Filed Jan. 4, 1935

INVENTOR
William La Hodny
by Parker, Grocknow & Farmer
ATTORNEYS

Patented Dec. 14, 1937

2,102,012

UNITED STATES PATENT OFFICE 2,102,012

SUPPORT

William La Hodny, Buffalo, N. Y.

Application January 4, 1935, Serial No. 403

9 Claims. (Cl. 88—98)

This invention relates to mountings for plates such as rear view mirror plates, and particularly to the type utilized either on the interior or exterior of motor vehicles to enable the driver to ascertain traffic conditions in the rear of the vehicle while looking forwardly. Various mountings for such plates or mirrors have been devised and used and this invention has for an object to provide an improved universal mounting for such plates.

Another object of the invention is to provide an improved universal mounting for plates, such as mirror plates, with which the supporting stud will be firmly and securely attached to the plate to be mounted, with which the plate may be adjusted or tilted into different angular positions on the stud and frictionally held in such different angular positions, with which such frictional, holding action will continue even after long use of the device and without adjustment, which will be attractive in appearance, which will not objectionably project from the plate, which will be relatively simple and inexpensive, and easily manufactured and assembled, which will require a minimum of attention during use, and which may be taken apart for shipping purposes so as to occupy a relatively flat and compact package.

Various other objects and advantages will be apparent from the following description of some embodiments of the invention, and the novel features will be particularly pointed out hereinafter in connection with the appended claims.

Figure 3:
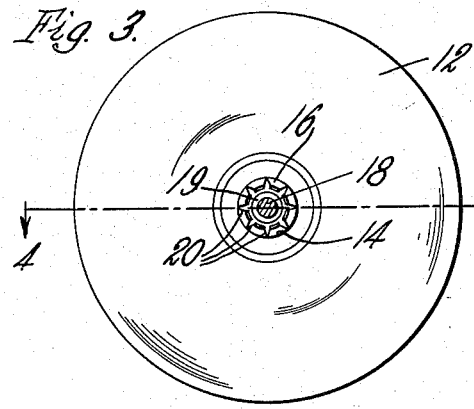
Fig. 3 is a sectional elevation of another type of rear view mirror, also supported in accordance with this invention, the section being taken approximately along the line 3—3 of Fig. 4.
Figure 4:
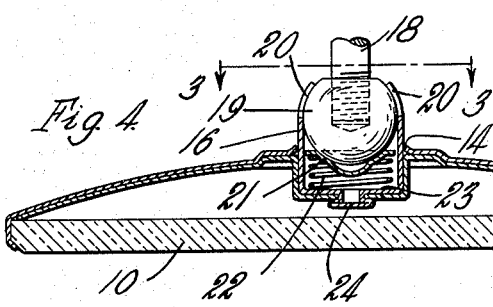
Fig. 4 is a sectional plan of the same, with the section taken approximately along the line 4—4 of Fig. 3.
Figure 6:
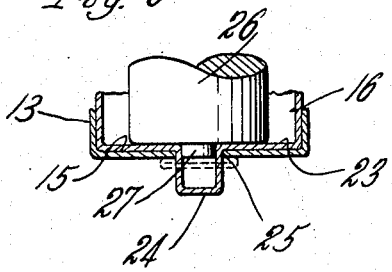
Figure 5:
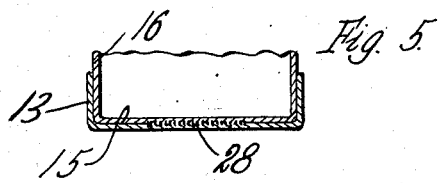

Fig. 5 is a sectional plan of a portion of the connection between the cup and the liner, and which may be employed in either of the embodiments of Figs. 1 to 4, and illustrating the welding of the cup to the liner; and Fig. 6 is a sectional elevation of a portion of the cup and liner, with a tool disposed in a relation thereto which it occupies while the cup and liner are being connected to another for the type of connection used in Figs. 3 and 4.

Figure 1:
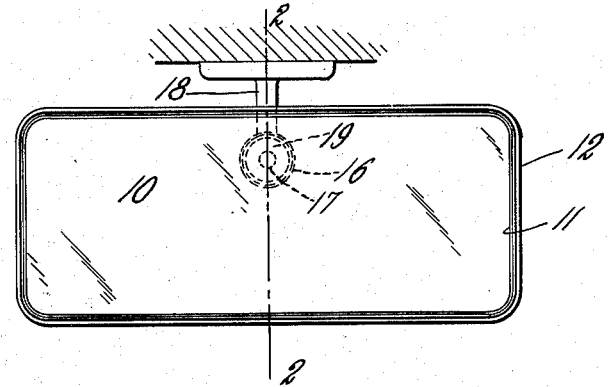
Fig. 1 is a front elevation of a rear view mirror supported in accordance with this invention, and of the type commonly employed in the interior of vehicles.
Figure 2:
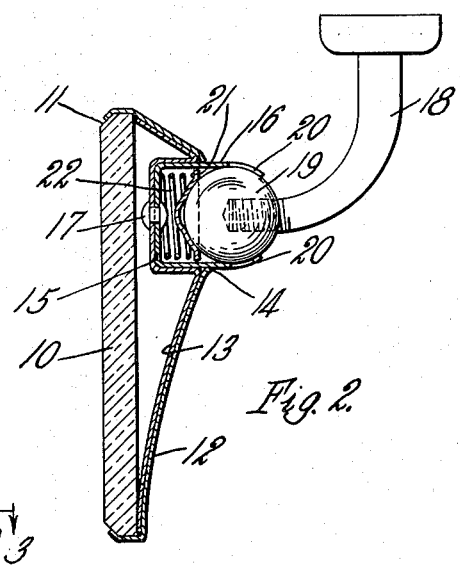
Fig. 2 is a sectional elevation of the same, the section being taken approximately along the line 2—2 of Fig. 1.

In the embodiment of the invention illustrated in Figs. 1 and 2, the plate to be mounted is a mirror plate 10, which may be of plate glass having upon its rear face a silvered surface as usual with mirrors of this type. Its peripheral edges are bevelled as at 11, for the sake of appearance and to facilitate the anchorage thereto of a suitable support.

A metal sheet or element 12 is disposed at the rear face of the plate 10 so as to cross the same, and its peripheral edges are flanged over the bevelled edges 11 of plate 10 so as to anchor the plate 10 firmly to the sheet or element 12. The sheet 12 preferably bows away from the rear face of the plate 10, in its interior area. Inasmuch as the sheet 12 is preferably made of relatively thin sheet metal in order that its peripheral edges may be easily and securely flanged over the frangible plate 10, it does not always have the desired rigidity in its interior area, and for that reason a reinforcing liner 13 of heavier sheet metal is preferably disposed face to face against the inner face of said sheet or element 12, as shown in Fig. 2, and this liner extends to the periphery of the plate 10 so that it will stiffen and reinforce the sheet 12 in the portion between the flanged edges of the sheet 12.

The sheet 12 is provided, in its interior area such as in the bowed out portion thereof, with an aperture 14 and the portion of the liner 13 which bridges or crosses the aperture 14 is drawn toward the plate 10 to form a tubular boss with a cavity or recess 15 which is aligned with the aperture 14 and which opens outwardly through the aperture 14. A cup 16 is received in and fits the aperture 14 and the recess 15, with the bottom or closed end of the cup abutting the bottom or closed end of the recess 15, and with the cup opening outwardly through the aperture 14. The cup 16 is anchored within the recess 15 in any suitable manner, preferably by attaching the abutting bottoms of the cup 16 and recess 15 to one another, such as by a rivet 17. The cup extends outwardly some distance beyond the aperture 14 and the recess 15 is of such substantial depth that the side wall of the recess telescopes snugly with the cup 16 for a substantial distance, and thus by itself prevents lateral rocking of the outer end of the cup.

A supporting stud 18 extends into the chamber of the cup 16 and terminates within this chamber in a ball-like head 19. While the head 19 may be formed integrally with the stud 18, it is preferably formed separately from the shank of the stud and threaded or otherwise removably fixed thereon, as shown in Fig. 2. The outer end portion of the cup 16, which is the portion along the outer open end thereof, is provided with a plurality of slits 20 which extend some distance endwise of the cup from the open end, so as to provide a plurality of tongues along the open edge of the cup, which, after the head 19 is inserted into the cup, are bent or flanged inwardly partially across the open end of the cup to confine the head 19 within the cup. These tongues preferably are bent arcuately, so as to provide concave seat portions for the ball 19, and these arcuate seats of the various tongues together form a complete outer seat for the head 19.

A disc 21 is provided in the chamber of the cup 16, between the head 19 and the bottom of the cup, and is made dished or concave so as to form a concave inner seat for the head 19. The central portion of the disc 21 is preferably drawn in the form of a small boss projecting from the convex side thereof, so that the central portion of the disc 21 does not engage the head 19 and leaves an annular, spherical, concave segment which fits the ball-like head 19 and forms the seat. The periphery of the disc 21 is slightly flanged away from the seat portion, and a helical spring 22 is compressed between the bottom of the cup and the peripheral flange of the disc 21.

The spring 22 acting on the disc 21 forces it against the head 19 and thereby provides a yielding inner seat for the head 19. It frictionally resists rocking movements of the head 19 within the cup, and frictionally holds the head 19 in different positions into which it may be rocked. In case of any wear between the head 19 and the seats, the spring 22 compensates automatically for such wear and maintains substantially the same frictional resistance on the head 19.

In the embodiment of the invention illustrated in Figs. 3, 4 and 6, parts corresponding to similar parts in Figs. 1 and 2 are designated by the same reference characters. In Figs. 3, 4 and 6, the plate 10 to be supported is a mirror plate and is shown as circular in shape. This circular type is commonly employed on the exterior of motor vehicles to indicate to the driver the traffic conditions in the rear of the vehicle. The metal sheet 12 is similar to the sheet 12 of Figs. 1 and 2, except that its periphery is circular and flanged over the circular bevelled edge 11 of the circular plate 10, and the liner 13 is similar to the liner 13 of Figs. 1 and 2, except that it is circular, and functions in a similar manner.

The supporting stud 18 is connected to the sheet 12 and liner 13 in the manner explained and illustrated in connection with Figs. 1 and 2, but instead of using the rivet 17 to anchor the bottoms of the cup 16 and recess 15 to one another as illustrated and explained for Figs. 1 and 2, a slightly different type of connection is used in Figs. 3 and 4. In this different type of connection, the bottom 23 of the cup 16 is provided with a tubular boss 24, Fig. 6, drawn outwardly. This boss 24 passes through an aperture 25 provided in the bottom wall of the recess 15, and the closed end of the boss 24 is then flattened out or riveted against the adjacent face of the liner 12, as shown by full lines in Fig. 4 and dash lines in Fig. 6.

For this purpose a tool 26, Fig. 6, is disposed within the cup 16 so as to abut against the bottom or closed end thereof and the end of this tool has a projection 27 which extends into and fills the boss 24 for a distance equal to the combined thickness of the liner 13 at the bottom of the recess 15 and the thickness of the bottom of the cup. While the tool 26 is held in the position shown in Fig. 6 the outer end of the boss 24 is hammered or pressed toward the tool 26 with the result that it is upset or deformed into the position shown by dash lines in Fig. 6 and by full lines in Fig. 4. When the end of boss 24 is so deformed or upset it forms a rivet head engaging with the liner 13 to effectively and securely anchor the cup 16 within the recess 15 of the liner. The tool 26 is then withdrawn.

Instead of the rivet 17 in Figs. 1 and 2, or the upset boss 24 in Figs. 3, 4 and 6, the abutting ends of the cup 16 and the recess 15 of the liner 13 may be spot welded together as shown at 28 in Fig. 5. It will be understood that the rivet 17, the upset boss 24, or the spot welding 28 may be employed in any of the embodiments of the invention which are illustrated in the drawing.

After the cup 16 is anchored to the liner in the recess 15, the disc 21 and spring 22 are disposed in the cup and the head 19 then inserted in the cup, after which the portion of the cup along its open edge is flanged inwardly to provide the outer seat for the head 19 and to confine the head within the cup. Thereupon the sheet 12 and liner 13 are applied to the mirror or plate 10, and the edges of the sheet 12 flanged over the plate 10 so as to connect the stud 18 to the plate. If desired, the usual backing for the mirror plate 10 may be disposed against the rear face of the mirror before the support therefor is attached.

When the parts are assembled, as shown in Figs. 1 to 4, the plate or mirror 10 will be supported on the stud 18 for limited universal adjustment thereon, and stud 18 is anchored to the vehicle in any suitable manner, after which the plate 10 may be rocked or tilted into the desired position by which the driver may observe traffic conditions in the rear of the vehicle while looking forwardly. The friction created by the spring 22, acting through the disc 21 upon head 19 will insure the frictional retention of the plate 10 in the different positions into which it may be tilted. It will be noted that because the cup 16 is sunk partially into or through the sheet or element 12 and liner 13, the cup will extend only a minimum distance outwardly beyond the sheet 12, and therefore the plate 10 will be disposed closely to the head 19 of the stud 18 which is a very compact relation. When the head 19 is separate from, but threaded to the stud 18, the latter may be unscrewed from the head 19 and the parts then packed in a relatively flat and compact package for shipment.

It will be understood that various changes in the details, materials and arrangement of parts, which have been herein described and illustrated in order to explain the nature of the invention, may be made by those skilled in the art within the principle and scope of the invention as expressed in the appended claims.

I claim as my invention:

1. A mounting for a plate such as a mirror plate which comprises a metal element adapted to cross a face of said plate and at its edges flanged for attachment over the edges of said plate so as to be anchored thereto, a reinforcing liner approximately coextensive in area with said plate and of stiffer material than said element, disposed face to face to said element and between said element and said plate, said liner having a relatively deep socket of substantial depth drawn therefrom in its interior area, with the closed end of the socket towards said plate, said element having an aperture aligned with the open end of said socket, a cup with a closed, imperforate bottom wall passing through said aperture and telescoping snugly with said socket to a depth such that the abutting side walls of the cup and socket by themselves prevent material lateral tilting of the outer end of the cup, the bottom end of the cup abutting and attached to the bottom of said socket, a stud extending into said cup from the outer open end thereof and terminating within the cup in a ball-like head, the portion of said cup around its open end being slit and flanged over said head to retain it within said cup, a movable seat confined in said cup between said head and the bottom of said cup and resilient means between said seat and inner end of the cup and pressing said seat against said head for frictionally holding said stud in different angular positions with respect to said cup into which it may be adjusted.

2. A mounting for a member such as a mirror which comprises an element formed for attachment against a face of said member to support it, a one-piece cup having an imperforate bottom wall, open at one end and by its bottom closed end secured to said element, so as to open in a direction away from said member, a stud extending into said cup through the open end thereof and terminating in a ball-like head, the portion of said cup around its open end being bent over said head to retain it within said cup, and resilient means confined in said cup between said head and the bottom of the cup and by its pressure on the head frictionally holding it in different angular positions into which it and said stud may be adjusted.

3. A mounting for a member such as a mirror, which comprises an element formed for attachment to said member and adapted to be disposed at one face thereof, said element having an aperture therein, a cup with an imperforate bottom wall received at its closed end in said aperture and having its open end at its outer end, a stud extending into the chamber of said cup and terminating in a ball-like head, the portion of said cup along its open end being flanged inwardly to confine said head within the cup, and resilient means compressed between the head and the bottom of the cup and exerting a frictional pressure on said head to retard its rocking movements in said cup.

4. A mounting for a member such as a mirror, which comprises, a metal sheet adapted to cross a face of said member and at its periphery flanged for attachment over the edges of said member to confine said member to said sheet, a portion of said sheet in its interior area being spaced from said member, a reinforcing liner abutting and approximately coextensive in area with the inner face of said sheet and disposed between it and said member, said sheet having an aperture in said interior area, said liner having a recess aligned and coextensive in cross section with said aperture drawn therefrom and opening outwardly through said aperture, a cup with a closed, imperforate bottom wall passing through and fitting said aperture and telescoping snugly into said recess with its closed end abutting the bottom wall of said recess, said recess having a substantial depth such that the abutting side walls of the recess and cup prevent lateral rocking of the cup in said recess, the bottom wall of said cup having an imperforate, tubular boss drawn therefrom toward said member, said liner having an aperture aligned with said boss and through which said boss extends, the free end of said boss after passing through said aperture being upset and flattened against the inner face of said liner around the entire periphery of said aperture to rivet said cup to said liner and provide a weathertight connection between them, a stud extending into said cup through the open end thereof and terminating within the cup in a ball-like head, said cup having means extending partially across its open end for confining said head within the cup and forming an outer seat therefor, and means within said cup for frictionally resisting rocking movement of said head within said cup.

5. A mounting for a member such as a mirror, which comprises, a backing element formed for attachment to said member and adapted to extend across a face thereof, said element having a depression in its outer face, a cup with an imperforate bottom wall received in said depression with its closed end abutting the bottom wall of said depression, the closed end of said cup having an imperforate tubular boss drawn outwardly therefrom and the bottom of said depression having an aperture through which said boss extends, the free end of said boss after extending through the aperture being upset without rupture against the bottom wall of said depression to rivet said cup within the depression, and a stud extending into said cup from the open end thereof and terminating in a ball-like head, said cup having means for confining said ball within the cup and forming with the head a limited universal joint.

6. A mounting for a plate such as a mirror plate, which comprises, a metal sheet adapted to cross a face of said plate and at its edges formed for attachment over the edges of said plate for anchorage thereto, a reinforcing liner disposed between said sheet and plate, coextensive with the face of said plate, and abutting face to face with said sheet to reinforce it, the interior area of said sheet having an aperture therein, said liner having a recess of substantial depth formed therein in alignment with said aperture and extending from the aperture toward said plate, a cup with a closed, imperforate, bottom wall snugly received in said aperture and recess to a substantial depth, and anchored to said liner, a stud extending through the open end of said cup and terminating within the cup in a ball-like head, a disc disposed in said cup between the bottom thereof and said head and forming an inner seat for said head, and a spring disposed in said cup and compressed between said disc and the bottom of said cup for urging said disc frictionally against said head, said cup being slit endwise to some extent from the open end thereof, and the free ends of the tongues formed by said slits being bent toward one another in arcs to form together a concave outer seat for said head which confines said head within said cup.

7. A mounting for a mirror plate and the like, which comprises, a metal sheet adapted to cross the rear face of said plate, and having its periphery formed for attachment over the peripheral edge of said plate, and with a portion of said sheet between its flanged edges bowed outwardly away from said plate, a reinforcing liner abutting the inner face of said sheet and extending substantially to the edges of said plate, the bowed portion of said sheet having an aperture, said liner having a portion thereof bridging said aperture and drawn toward said plate to form an outwardly opening recess of substantial depth, a cup with a closed imperforate bottom wall received snugly in said aperture and recess, and at its closed end abutting the inner end of said recess, the abutting bottoms of the recess and cup being anchored to one another, the depth of said recess being such that the engagement of the side wall thereof with the abutting side wall of the cup by itself prevents lateral rocking of the cup in the recess and a stud extending into the open end of said cup and terminating within the cup in a ball-like head, said cup having means along its open end extending partially across said open end and confining said head within said cup.

8. A mounting for a mirror plate and the like, which comprises, a metal sheet adapted to cross the rear face of said plate, and having its periphery formed for attachment to the peripheral edge of said plate, and with a portion of said sheet between its flanged edges bowed outwardly away from said plate, a reinforcing liner abutting the inner face of said sheet and extending substantially to the edges of said plate, the bowed portion of said sheet having an aperture, said liner having a portion thereof bridging said aperture and drawn toward said plate to form an outwardly opening recess of substantial depth, a cup with a closed, imperforate bottom wall received snugly in said aperture and recess, and at its closed end abutting the inner end of said recess, the abutting bottoms of the recess and cup being anchored to one another, the depth of said recess being such that the engagement of the side wall thereof with the abutting side wall of the cup by itself prevents lateral rocking of the cup in the recess and a stud extending into the open end of said cup and terminating within the cup in a ball-like head, said cup having means along its open end extending partially across said open end and confining said head within said cup, and resilient means within said cup and bearing on said head to provide a yielding, frictional pressure on said head to hold it in different rockable positions in said cup.

9. A mounting for a member such as a mirror which comprises means formed for enclosing the periphery of said member and supporting it, and including a stiff element adapted to extend over the interior of the rear face of said member, a cup-shaped shell abutting at its bottom wall against the outer face of said element, the bottom wall of said shell being closed and imperforate and having an imperforate, tubular boss drawn outwardly and unbroken from said bottom wall toward said element, and smaller in cross section than said bottom wall, said element having an aperture through which said boss extends, the free end of said boss after extending through said aperture being upset and flattened while unbroken against the inner face of said element around the entire periphery of said aperture, to rivet said shell to said element and provide a weatherproof connection between said shell and element, and means extending into said shell at the open end thereof and articulately connected thereto for supporting said shell and through it said element and member for rocking movement thereon.

WILLIAM LA HODNY.